US005140290A

United States Patent [19]

Dersch

[11] Patent Number: 5,140,290

[45] Date of Patent: Aug. 18, 1992

[54] DEVICE FOR INDUCTIVE CURRENT LIMITING OF AN ALTERNATING CURRENT EMPLOYING THE SUPERCONDUCTIVITY OF A CERAMIC HIGH-TEMPERATURE SUPERCONDUCTOR

[75] Inventor: Helmut Dersch, Würenlos, Switzerland

[73] Assignee: Asea Brown Boveri Ltd., Baden, Switzerland

[21] Appl. No.: 793,299

[22] Filed: Nov. 14, 1991

Related U.S. Application Data

[63] Continuation of Ser. No. 379,265, Jul. 13, 1989, abandoned.

[30] Foreign Application Priority Data

Aug. 2, 1988 [CH] Switzerland ........................ 2894/88

[51] Int. Cl.[5] ........................ H01F 17/04; H02H 9/00

[52] U.S. Cl. ............................ 336/221; 336/DIG. 1; 335/216; 323/355; 323/360; 505/705; 505/850; 505/869; 505/870; 505/1; 361/19

[58] Field of Search .................. 336/221, 15, DIG. 1; 335/216; 323/355, 360; 361/19; 505/705, 850, 869, 870; 174/15.4, 15.5

[56] References Cited

U.S. PATENT DOCUMENTS

| | | | |
|---|---|---|---|
| 2,946,030 | 7/1957 | Slade | 326/155 |
| 3,094,628 | 6/1963 | Jiu . | |
| 3,611,078 | 10/1971 | Massar et al. | 361/19 |
| 3,703,664 | 11/1972 | Cronin | 317/20 |
| 4,031,457 | 6/1977 | Oberbeck | 323/362 |
| 4,700,257 | 10/1987 | Bekhaled . | |
| 4,812,796 | 3/1989 | Ries | 335/299 |
| 4,894,360 | 1/1990 | Leupold | 505/1 |
| 4,910,626 | 3/1990 | Collet et al. | 335/216 |

FOREIGN PATENT DOCUMENTS

| | | | |
|---|---|---|---|
| 1089801 | 9/1960 | Fed. Rep. of Germany . | |
| 1025509 | 7/1987 | Japan | 505/705 |

OTHER PUBLICATIONS

I.E.E.E. Spectrum vol. 25, No. 5 May 1988 (New York, U.S.) K. Fitzgerald: "Superconductivity: fact vs fancy", pp. 30–41.

K. E. Gray, et al., "A superconducting fault-current limiter", J. Appl. Phys. 49, pp. 2546–2550, Apr. 1978.

B. P. Raju, et al., "Fault-current limiter with superconducting DC bias" IEE Proc. 129, Pt. C. No. 4, pp. 166–171, Jul. 1982.

*Primary Examiner*—Leo P. Picard
*Assistant Examiner*—Bot Lee Ledynh
*Attorney, Agent, or Firm*—Oblon, Spivak, McClelland, Maier & Neustadt

[57] ABSTRACT

A device for inductive current limiting of an alternating current consisting of an induction coil (2), which includes at least one winding and through which current flows, a body (3) made of a ceramic high-temperature superconductor arranged concentrically to the latter and having a centrosymmetrical form which is hollow in the interior, and having located in the interior of said body (3) a concentrically arranged core (4) made of a soft magnetic material of high permeability. In normal operation (rated current), the superconductivity of the body (3) is effective and impedance of the induction coil (2) is very low. With overcurrent (mains short-circuit) the superconductivity disappears and the impedance of the induction coil (2) reaches its maximum, current-limiting value.

12 Claims, 1 Drawing Sheet

DEVICE FOR INDUCTIVE CURRENT LIMITING OF AN ALTERNATING CURRENT EMPLOYING THE SUPERCONDUCTIVITY OF A CERAMIC HIGH-TEMPERATURE SUPERCONDUCTOR

This application is a continuation of application Ser. No. 07/379,265, filed on Jul. 13, 1989, now abandoned.

BACKGROUND OF THE INVENTION

1. Field of the Invention

The present invention relates to a ceramic high-temperature superconductor and its use in heavy-current electrical engineering.

The invention also relates to the further development of inductive current limiters for alternating current, bodies electromagnetically coupled to the operating current and with greatly variable resistance behavior (superconductors) being used.

In particular, it relates to a device for inductive current limiting of an alternating current making use of the superconductivity of a ceramic high-temperature superconductor, there being provided an induction coil which consists of at least one winding and through which current flows, as well as a body made of a superconducting substance arranged concentrically to the latter.

2. Discussion of Background

Current limiters in the high-current range of above 1 kA alternating current can be used advantageously in distribution networks, as generator protection, transformer protection or apparatus protection. All these devices are ones which counter the current from a particular value onwards (for example in the case of five-fold mains current) gradually to suddenly with a much higher resistance and limit it in this manner to a maximum possible value. Devices have been proposed for this purpose based on the principle of superconductivity, various embodiments being known:

Resistive (ohmic) limiter: In the case of a short-circuit, a superconducting element becomes normally conductive and commutes the current to a limiting resistance (cf. K. E. Gray and D. E. Fowler, "A superconducting fault-current limiter", J. Appl. Phys. 49, pages 2546–2550, Apr. 1978).

Inductive limiter: Transformer with direct current biasing. A transformer has a superconducting secondary winding carrying a direct current which magnetizes the iron core until saturation. The impedance of the apparatus is thus kept low. In the case of a short-circuit, the core is removed from the saturation and the impedance rises greatly (cf. B. P. Raju and T. C. Bartram, "Fault-current limiter with superconducting DC bias", IEEE Proc. 129, Pt. C. No. 4, pages 166–171, Jul. 1982).

Inductive limiter: Transformer with short-circuited superconducting secondary winding. The short-circuited secondary winding considerably reduces the inductance of the transformer in normal operation. In the case of a short-circuit, the superconductor is switched to the normally conducting state and the inductance rises greatly: resistive limiter with transformer with impedance matching (cf. U.S. Pat. No. 4,700,257).

The known alternating current limiters are bulky and complex and require, since they are based on classic superconductors, considerable cooling outlay. There is therefore a requirement for the further development and refinement of current limiters.

SUMMARY OF THE INVENTION

Accordingly, one object of this invention is to provide a novel device for inductive current limiting of an alternating current making use of the superconductivity of a ceramic high-temperature superconductor, and using an induction coil through which current flows and a body made of a superconducting substance arranged concentrically to the latter, which body achieves the greatest possible effect with a small design volume. The device should be simple in terms of construction, have the smallest possible volume to be cooled, and manage without external sources of direct current or alternating current.

This object is achieved in that the device mentioned at the beginning contains a body made of a superconducting substance having a centrosymmetrical form which is hollow in the interior, and in that there is located in the interior of said body a concentrically arranged centosymmetrical core made of a soft magnetic material of high permeability.

The discovery of ceramic oxide superconductors with high transition temperatures of more than 77 K makes possible new constructions and methods of operation of current limiters. The present invention is concerned with the development of a combined inductive/resistive current limiter.

The principle is as follows: A conventional choke coil (induction coil) with iron core is used as a limiting element (series connection in the current circuit). The iron core is provided with a jacket made of a superconducting substance. In normal operation, that is with currents below the switching current (max. current) the jacket is in the superconducting state and shields the magnetic field of the winding completely from the iron core (Meissner effect). The inductance is therefore low. The jacket thickness is dimensioned so that at the desired switching current the magnetic field of the winding switches off the superconduction in the jacket. The device then behaves like a conventional choke coil and limits the short-circuit current. The essential advantages and novel features of this principle are:

As a result of the jacketing of the core over the full winding length of the induction coil, a complete shielding of the core from the magnetic field is achieved in normal operation. This leads to a substantial reduction of losses in normal operation, in particular iron losses and stray losses are greatly reduced or avoided completely.

As a result of the arrangement of the superconducting jacket in the field area of the current-carrying winding, quenching is greatly supported in the case of a short-circuit. It is known that often only an unsatisfactory quenching can be achieved by means of induced currents or current pulses. The magnetic field of the winding which is always automatically present ensures a smooth transition of the superconductor to the normal state.

The arrangement of the superconducting jacket in the field area of the current-carrying winding leads to a distinctly higher electrical resistance of the superconducting layer in the normal conducting state. This is a consequence of the great magnetic field dependency of the critical currents as well as of the current/voltage characteristics found in ceramic oxide superconductors. The high electrical resistance of the jacket in the normal conducting state increases the choke effect of the coil, which would otherwise be reduced by induced eddy currents in the jacket.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
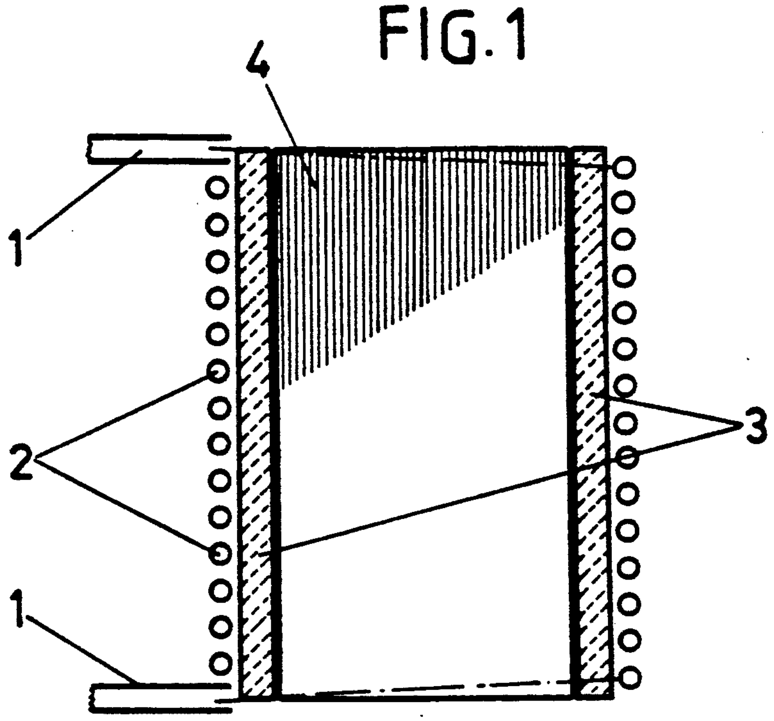
FIG. 1 shows a diagrammatic longitudinal section through the basic construction of a device with rotationally symmetrical components.

Referring now to the drawings, wherein like reference numerals designate identical or corresponding parts throughout the several views, FIG. 1 shows a diagrammatic longitudinal section through the basic construction of a device with rotationally symmetrical components. Reference numeral 1 denotes the current connection for alternating current for an induction coil 2 in the form of a copper winding. Reference numeral 3 denotes a rotationally symmetrical body made of a superconducting substance in the form of a ceramic high-temperature superconductor (for example SE $Ba_2Cu_3O_{6.5+y}$ where SE=rare earth metal and $0<y<1$). Located in the interior of the body 3 is a core 4 made of soft magnetic material, for example iron. The core 4 is laminated (transformer sheets) as a rule to reduce the eddy-current losses, which would be equivalent to an impedance loss, or is designed in the form of wires or powders embedded in insulating compound.

Figure 2:
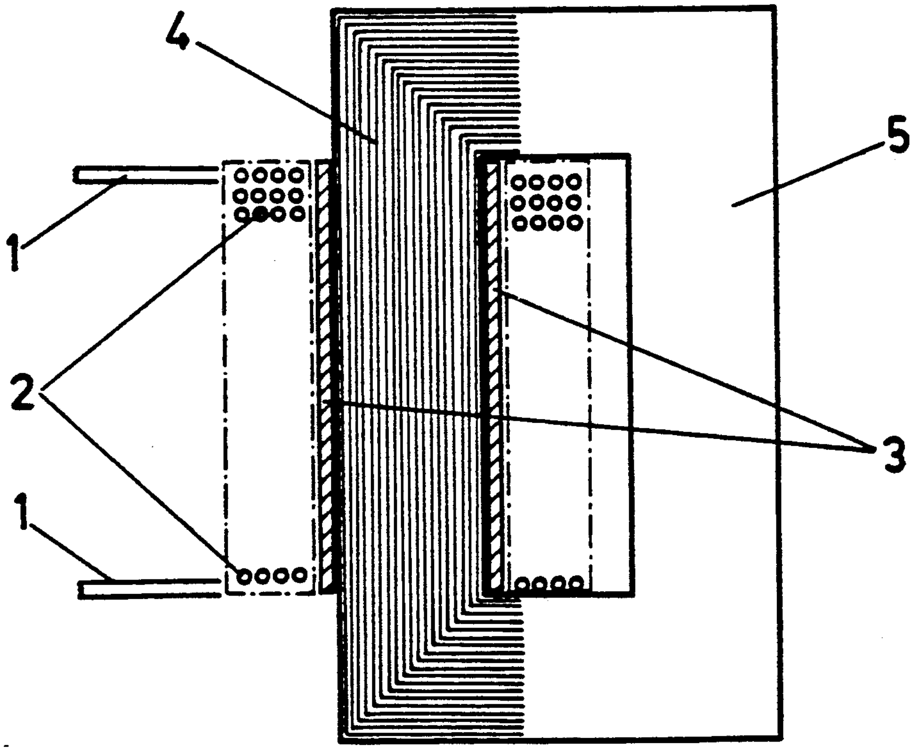
FIG. 2 shows a diagrammatic longitudinal section through the construction of a device with closed magnetic circuit.

FIG. 2 relates to a diagrammatic longitudinal section through the construction of a device with closed magnetic circuit. Reference numeral 1 denotes the current connection to the induction coil 2, which in the present case is composed of a multi-layer cylinderical copper winding. Reference numeral 3 denotes the body made of a superconducting substance (ceramic high-temperature superconductor) designed in the form of a thin-walled cylinder. The core 4 made of soft magnetic material (laminated iron) has its continuation in a yoke 5 for closing the magnetic circuit. As a result of this, optimum magnetic flux conditions are obtained and the maximum possible inductance achieved.

EXEMPLARY EMBODIMENT 1:

Similar to FIG. 1.

An inductive current limiter was designed for the following data:

Rated current=1 kA

Maximum current=5 kA

Rated voltage=5 kV

The radial thickness (wall thickness) of the hollow cylindrical body 3 made of superconducting substance (in the present case $Y Ba_2Cu_3O_7$) is obtained as follows:

$I_s=j_{crit}(r_2-r_1)=I \cdot n/1$ $I_s$=shielding short-circuit current in body 3

$j_{crit}$=critical current density $2r_1$=inside diameter of body 3

$2r_2$=outside diameter of body 3

I=operating current of induction coil 2 n=number of windings of induction coil 2

1=length of induction coil 2

For n=20; 2=1 m (1000 mm); $j_{crit}$=200 $A/cm^2=2 \cdot 10^6\ A/m^2$; I=1000 A the wall thickness is $$r_2-r_1=1 \text{ cm } (10 \text{ mm})$$

For the diameter $2r_1$ of the core 4 made of soft magnetic material (in the present case iron), the following relationships are obtained:

$Z=\mu.\mu_o n^2/1.F_{core}\omega$

Z=impedance $\mu$=relative permeability $\mu_o$=absolute permeability $F_{core}$=cross-section of the core $4=\pi r^2$ $\omega$=angular frequency Where $I_{max}$=5000 A, Z should=1Ω.

The magnetic field strength reaches the value of 1.3 kOe; that is, $\mu$ is approximately 20. It follows from this that:

$$r_1 = \sqrt{\frac{z}{\mu \cdot \mu_0} \cdot \frac{1}{n^2} \cdot \frac{1}{\omega} \cdot \frac{1}{\pi}} = 31 \text{ cm}(310 \text{ mm})$$

$$r_2=310+10=320 \text{ mm}$$

The loss in the body 3 is:

$$P=(B_m^2/2\mu_0).(\beta/3).(50/s)$$

$\beta=\beta_m/B_p$ $B_p$=induction of the external magnetic field, in the case where this is just penetrates into the core $4=2(r_2-r_1)$ $B_m$ is approx. 250 G; $B_p$=500 g;=0.5

$P=2 \cdot 10^3\ W/m^3$

With a volume of the body 3 of approximately 0.01 $m^3$, a total loss of only 20 W is produced with operating current.

The air-cooled induction coil 2 consisted of a single-layer copper winding with 20 windings. The copper cross-section was $20 \times 20=400\ mm^2$, the current density was 2.5 $A/mm^2$. The distance from the middle of the winding to the middle of the winding was 40 mm. The core 4 made of soft magnetic material was laminated (transformer sheets 0.3 mm thick) and closed by a yoke (not shown in FIG. 1) to close the magnetic circuit completely.

EXEMPLARY EMBODIMENT 2

See FIG. 2.

The data of the inductive current limiter were as follows:

Rated current: 1 A

Maximum current: 3 A

A laminated core 4 was made from 0.3 mm thick transformer sheets. The core 4 had a length of 150 mm and a diameter of 30 mm. The magnetic circuit was closed by a likewise laminated yoke 5.

The induction coil 2 provided with the current connections 1 was composed of a four-layer coil with a total of 250 windings of insulated copper wire of 2 mm diameter (cross-section 3.14 $mm^2$) The pure ohmic resistance of the induction coil was approximately 0.21 Ω. The current density at the rated current was approximately (0.32 $A/mm^2$, that at maximum current was approximately 0.95 $A/mm^2$. It was deliberately kept low in order to keep the losses and hence the cooling output low both in normal operation and in the case of a short-circuit. At rated current, the ohmic losses of the induction coil 2 were approximately 0.21 W, at maximum current approximately 1.9 W.

The body 3 made of a superconducting substance was produced as a hollow cylindrical, ceramic sintered body. Its dimensions were:

Outside diameter=35 mm
Inside diameter=31 mm
Wall thickness=2 mm
length=150 mm

The composition of the body 3 corresponded to the formula $$Y\ Ba_2\ Cu_3\ O_{6.95}$$

It was produced by mixing oxide powders and carbonate powders, calcination, pressing and reactive sintering at 930° C. in $O_2$ atmosphere.

The entire device was placed in a heat-insulated vessel and cooled with liquid nitrogen at a temperature of 77 K.

The experiments showed that the choke coil without body 3 made of a superconducting substance exhibited an impedance of 2.5 for alternating current operation under a frequency of 50 Hz. In the case of operation with body 3, the impedance was reduced to less than 0.1 (pure inductive) by the superconducting shielding. With the maximum current of 3 A, the superconductivity broke down and the impedance rose to 2.5. The difference in current intensity in the transition range between low impedance/high impedance was less than 1 A.

EXEMPLARY EMBODIMENT 3

See FIG. 2.

The construction of the device corresponded substantially to that of Example 2.

A mixture with the following composition was used for the body 3 made of the superconducting substance:

$$Bi_2\ Sr_2\ Ca\ Cu_2\ O_8$$

The body 3 was produced by mixing the oxides in the correct ratio, ramming up in a mold, pressing and reactive sintering. The experiments showed a similar behavior as in Example 2. Due to a higher transition temperature and hence the greater available temperature gradient up to the temperature of the liquid nitrogen, the scope for setting the device was broader.

EXEMPLARY EMBODIMENT 4

See FIG. 2.

The construction of the device corresponded approximately to that of Example 2.

The body 3 consisted of the following superconducting substance with the formula:

$$Tl_2\ Ba_2\ Ca_2\ Cu_3\ O_{10}$$

First of all, the starting materials were mixed in the form of oxides, pre-sintered, crushed, ground, the powder pre-pressed in a mold at elevated temperature and the body 3 was given its final form by reactive sintering. With respect to the results of the experiment, those set out under Example 4 are valid.

The invention is not restricted to the exemplary embodiments.

In principle, the device for inductive current limiting of an alternating current making use of the superconductivity of a ceramic high-temperature superconductor consists of an induction coil which consists of at least one winding and through which current flows, as well as a body made of a superconducting substance arranged concentrically to the latter, wherein the body made of a superconducting substance has a centrosymmetrical form which is hollow in the interior, and wherein there is located in the interior of said body a concentrically arranged centrosymmetrical core made of a soft magnetic material of high permeability.

The body made of the superconducting substance belongs to one of the following types:

$SE\ Ba_2\ Cu_3\ O_{6.5+y}$, where SE is a rare earth metal and $0<y<1$;
$(La, Ba, Sr)_2\ Cu\ O_4$;
$Bi_2\ Sr_2\ Ca\ Cu_2\ O_8$;
$Tl_2\ Ba_2\ Ca_2\ Cu_3\ O_{10}$ The body made of a superconducting substance has the form of a hollow cylinder and the core made of soft magnetic material has that of a full cylinder consisting of soft iron.

In another embodiment, the body made of a superconducting substance has the form of a hollow cylinder and the core made of a soft magnetic material has that of a full cylinder, which is extended by a yoke to form a complete, self-contained magnetic circuit.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. A high power inductive current limiter, comprising:
   a first body made of a soft magnetic material of high permeability, said first body having at least a cylindrical part with an outer diameter;
   a second hollow cylindrical body made of a ceramic high temperature superconducting material, said second body having an inner diameter which is greater than said outer diameter of said cylindrical part of said first body, and said second body surrounding said cylindrical part of said first body; and
   an induction coil with at least one winding, said induction coil being wound on said second body;
   wherein said current limiter is a two-terminal device having first and second terminals, said induction coil having first and second ends respectively connected to said first and second terminals.

2. A high power inductive current limiter as claimed in claim 1, wherein said ceramic superconducting material of said second body comprises one of the group consisting of:
   $SEBa_2Cu_3O_{6.5+y}$, where SE is a rare earth metal and $0<y<1$;
   $(La,Ba,Sr)_2CuO_4$;
   $Bi_2\ Sr_2CaCu_2O_8$; and
   $Tl_2Ba_2Ca_2Cu_3O_{10}$.

3. A high power inductive current limiter as claimed in claim 1, wherein said first body comprises, outside said cylindrical part, a yoke which, together with said cylindrical part, makes up a closed magnetic circuit.

4. A high power inductive current limiter as claimed in claim 1, wherein said second body has a wall thickness which is at least 2 mm.

5. A high power inductive current limiter, comprising:

a first body made of a soft magnetic material of high permeability, said first body having at least a cylindrical part with an outer diameter;

a second hollow cylindrical body made of a ceramic high temperature superconducting material, said second body having a wall thickness which is at least 2 mm, and an inner diameter which is greater than said outer diameter of said cylindrical part of said first body, and said second body surrounding said cylindrical part of said first body; and an induction coil with at least one winding, said induction coil being wound on said second body;

wherein said current limiter is a two-terminal device having first and second terminals, said induction coil having first and second ends respectively connected to said first and second terminals.

6. A high power inductive current limiter as claimed in claim 5, wherein said ceramic superconducting material of said second body comprises one of the group consisting of:

$SEBa_2Cu_3O_{6.5+y}$, where SE is a rare earth metal and $0<y<1$;

$(La,Ba,Sr)_2CuO_4$;

$Bi_2Sr_2CaCu_2O_8$; and $Tl_2Ba_2Ca_2Cu_3O_{10}$.

7. A high power inductive current limiter as claimed in claim 7 wherein said first body comprises, outside said cylindrical part, a yoke which, together with said cylindrical part, makes up a closed magnetic circuit.

8. A high power inductive current limiter, comprising:

a first body made of a soft magnetic material of high permeability, said first body having at least a cylindrical part with an outer diameter;

a second hollow cylindrical body made of a ceramic high temperature superconducting material which comprises one of the group consisting of $SEBa_2Cu_3O_{6.5+y}$, where SE is a rare early metal and $O<y<1$;

$(La,Ba,Sr)_2CuO_4$;

$Bi_2Sr_2CaCu_2O_8$; and $Tl_2Ba_2Ca_2Cu_3O_{10}$;

said second body having a wall thickness which is at least 2 mm, and an inner diameter which is greater than said outer diameter of said cylindrical part of said first body, and said second body surrounding said cylindrical part of said first body; and an induction coil with at least one winding, said induction coil being wound on said second body;

wherein said current limiter is a two-terminal device having first and second terminals, said induction coil having first and second ends respectively connected to said first and second terminals.

9. A high power inductive current limiter as claimed in claim 8, wherein said first body comprises, outside said cylindrical part, a yoke which, together with said cylindrical part, makes up a closed magnetic circuit.

10. A high power inductive current limiter as claimed in claim 1, comprising:

means for cooling said first body, said second hollow cylindrical body and said induction coil using liquid nitrogen.

11. A high power inductive current limiter as claimed in claim 5, comprising:

means for cooling said first body, said second hollow cylindrical body and said induction coil using liquid nitrogen.

12. A high power inductive current limiter as claimed in claim 8, comprising:

means for cooling said first body, said second hollow cylindrical body and said induction coil using liquid nitrogen.

* * * * *